United States Patent  [19]

Kwok

[11] 4,093,301
[45] June 6, 1978

[54] MOVABLE DOOR FOR A VEHICLE

[76] Inventor: Samuel W. T. Kwok, 2642A Baldwin La., Walnut Creek, Calif. 94596

[21] Appl. No.: 727,262

[22] Filed: Sep. 27, 1976

[51] Int. Cl.² ............................................. B60P 3/32
[52] U.S. Cl. .................................. 296/23 MC; 52/2; 135/1 A
[58] Field of Search ...................... 296/23 R, 23 MC; 135/1 A, 5 A; 52/2

[56] References Cited

U.S. PATENT DOCUMENTS

| | | | |
|---|---|---|---|
| 3,297,355 | 1/1967 | Robinson | 296/23 |
| 3,321,234 | 5/1967 | Harrell | 296/23 |
| 3,586,119 | 6/1971 | Chuchua | 296/23 |
| 3,637,251 | 1/1972 | Plant | 296/23 MC |
| 3,638,991 | 2/1972 | Hathaway | 296/23 MC |
| 3,719,244 | 3/1973 | Miller | 296/23 MC |
| 3,729,224 | 4/1973 | Hathaway | 296/23 MC |
| 3,816,867 | 6/1974 | Shirzad | 135/5 A |
| 3,837,700 | 9/1974 | Van Slyke | 296/23 MC |
| 3,840,266 | 10/1974 | Carlson | 296/23 MC |
| 3,900,224 | 8/1975 | Copeland | 296/23 MC |

Primary Examiner—Joseph F. Peters, Jr.
Assistant Examiner—John A. Carroll
Attorney, Agent, or Firm—Phillips, Moore, Weissenberger, Lempio & Majestic

[57] ABSTRACT

A truck having a cab and a camper body installed on its horizontal bed includes aligned openings in the rear wall of the truck cab and the forward wall of the camper body in order to permit passengers to pass freely therebetween. The openings are closable by slidable doors which are laterally movable in opposite directions by roller and track support members. A removable top panel on the truck cab roof and overhang floor of the camper body facilitates vertical clearance for passengers going through the openings. Also facilitating movement through the opening is a pivot arrangement whereby the center portion of the truck seat may be tilted forward into the cab and out of the opening. A flexible quilted boot filled with insulative material and having fasteners thereon is moldable over the perimeter of the openings and securable to fasteners on the forward and rear walls so as to seal against the entry of air, dirt, and other contaminants.

10 Claims, 7 Drawing Figures

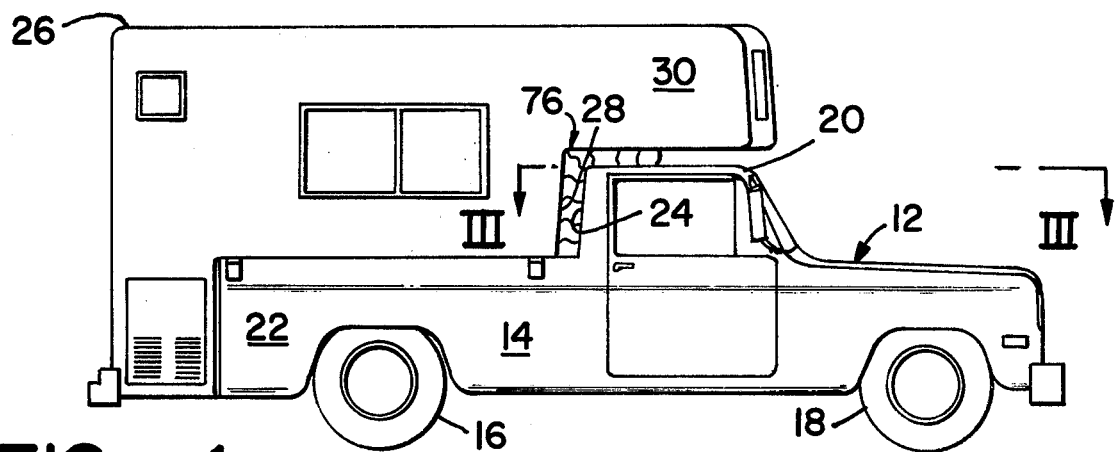
FIG _ 1
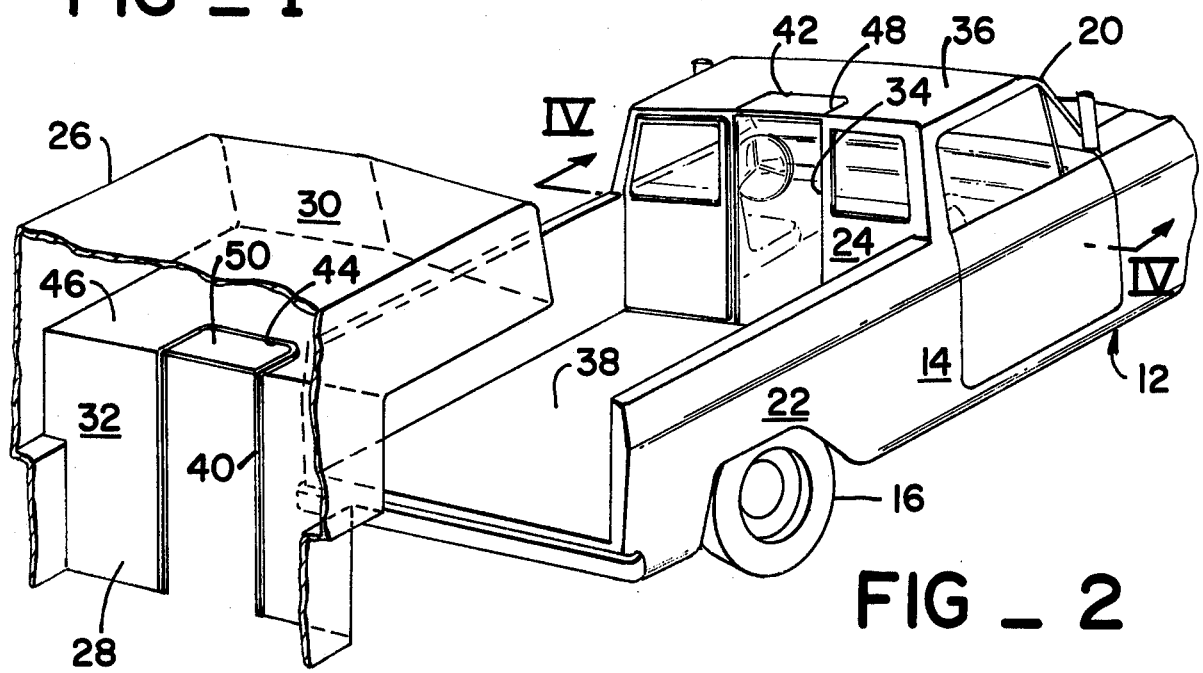
FIG _ 2
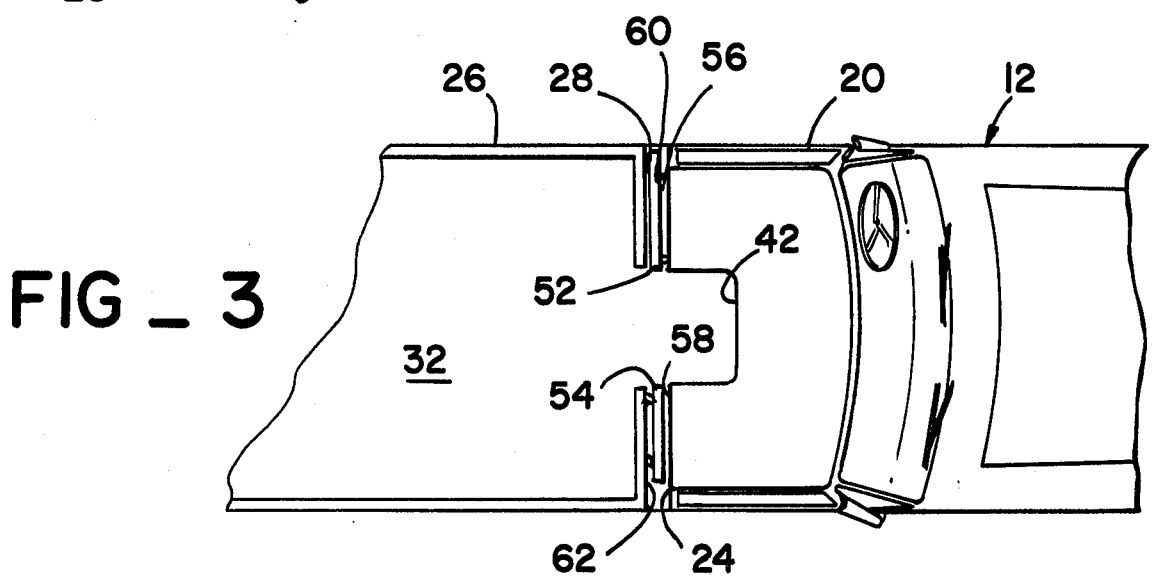
FIG _ 3

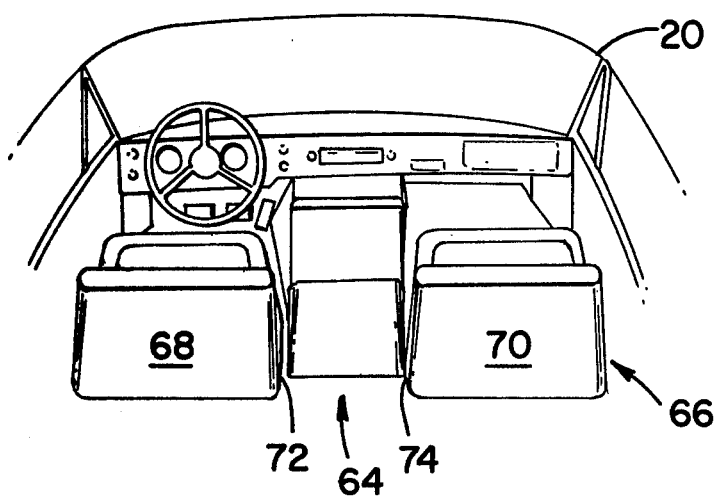
FIG _ 4
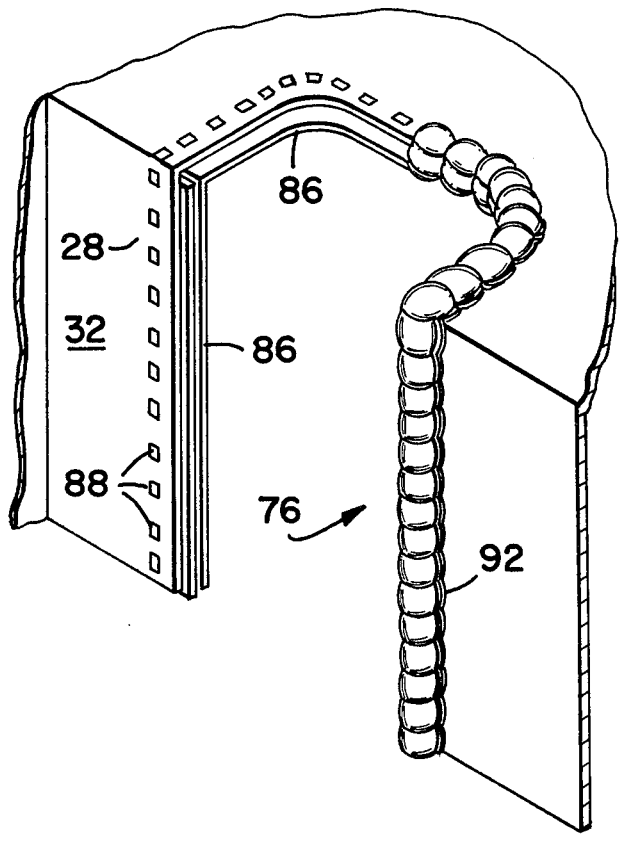
FIG _ 5
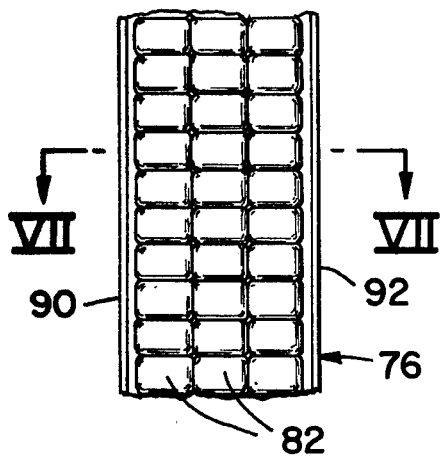
FIG _ 6
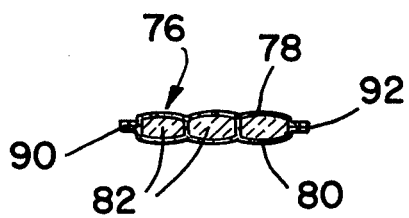
FIG _ 7

MOVABLE DOOR FOR A VEHICLE

BACKGROUND OF THE INVENTION

This invention relates to a truck cab and camper combination and more particularly to an arrangement for permitting free transfer of passengers therebetween. Still more particularly, this invention concerns a slidable door arrangement and the pertinent structures for permitting such free transfer.

In recent times, improved roads and increased leisure time have given rise to the proliferation of the recreational vehicle. Recreational vehicles or RV's have taken many forms. One of the earliest and still most popular is the pick-up truck and camper combination. With this type of RV, a standard pick-up truck having an elongated bed extending rearwardly of a cab has mounted thereon a camper body. Typically, the camper body has a front overhang which is slightly spaced from and portruding over the roof or top wall of the cab. The rear wall of the cab has the truck bench seat mounted forwardly thereof and includes a rear window.

One of the problems with this type of RV is the lack of the ability to communicate between the cab and camper body both in terms of passing of objects as well as to transfer passengers therebetween, which is especially desirable while the vehicle is in motion.

Partial solutions to this problem have been attempted. For example, U.S. Pat. No. 3,321,234 to Harrell et al shows a slidable window closure and sealing boot combination. This particular combination allows for the passing of objects between the cab and the camper body. However, the transference of passengers is not practicable.

In order to solve this problem, other solutions have been attempted. U.S. Pat. No. 3,729,224 to Hathaway shows one such attempt. With this device, a full length doorway is provided. However, this device is not entirely satisfactory in that the pivotal doorways used therewith are designed to be fitted flush with the front wall of the camper when the camper is attached. Another approach, shown in U.S. Pat. No. 3,297,355 to Robinson, is that of providing a curtain in the opening between the cab and camper body. This is obviously somewhat lacking in providing a secure closure.

Another problem encountered with the application thus described is that of providing a seal between the cab and camper when utilizing such openings. The seal is necessary in view of the air, dirt, and other contaminants that tend to blow into the cab and camper through the openings therebetween, especially when the vehicle is in motion.

SUMMARY AND OBJECTS OF THE INVENTION

It is therefore the primary object of this invention to provide an improved vehicle arrangement for a cab and camper combination.

It is a further object of this invention to provide such an arrangement having sliding doors which move in opposite directions and stow easily between the cab and camper.

It is a further object of this invention to provide such an arrangement having a tiltable seat portion to facilitate transference therebetween.

It is a still further object of this invention to provide such an arrangement having an improved seal boot for keeping out air, dirt, and other contaminants.

The invention takes the form of a truck including a cab defining a rear wall and a generally horizontal bed for supporting a camper body. The enclosed camper body defines a forward wall facing the rear wall of the truck cab. An opening in the rear wall of the truck cab corresponds to and is aligned with an opening in the forward wall of the camper body. Slidable doors are provided on the cab rear wall and camper body front wall which move by means of roller and track means in opposite directions into the space between the cab and camper body. In this manner, the doors take up a minimum of space. The doors are mounted on articulated arm means whereby they may be moved laterally to their respective openings and then longitudinally into the openings. Openings on the truck cab top wall and camper body overhang bottom wall which are similarly aligned, have removable doors fitted therein for facilitating vertical clearance. A seal boot in the form of a generally flat, flexible member which is quilted and contains a plurality of interior spaces filled with insulative material seals the perimeter between the openings. The boot is attached by means of fasteners such as Velcro fasteners secured to the peripheral edges of the boot and engageable with corresponding fasteners on the forward and rear walls.

Further and other objects and advantages will become more readily apparent from a review of the following description and accompanying drawings.

BRIEF DESCRIPTION OF THE DRAWINGS

FIG. 1 is a side elevation view of a pick-up truck and camper combination including the instant invention;

FIG. 2 is a top quarter isometric view of the same exploded and in partial section for purposes of clarity;

FIG. 3 is a cross-sectional view taken along lines III—III in FIG. 1;

FIG. 4 is a view of the interior of the truck cab taken along lines IV—IV in FIG. 2;

FIG. 5 is a top quarter isometric view of the aligned openings between the truck cab and camper body and illustrating details of the boot;

FIG. 6 is a partial view of the boot of FIG. 5 in flattened form; and,

FIG. 7 is a cross-sectional view taken along lines VII—VII in FIG. 6.

DETAILED DESCRIPTION

Turning to FIG. 1, there is shown generally at 10 a pick-up truck cab and camper combination. The truck 12 includes a body 14 mounted on a frame (not shown) and supported by a plurality of wheels, two of which are shown at 16,18. The truck includes a cab 20 and a bed 22 extending rearwardly from the rear wall 24 thereon. The bed supports a camper body 26 having a forward wall 28 spaced from rear wall 24. As is typical with camper bodies, a front overhang 30 provides additional space within the interior of the camper body 32.

As best seen in FIG. 2, an opening 34 is centrally disposed in rear wall 24 from top wall or roof 36 of cab 20 to the floor 38 of bed 22. Similarly, a like-dimensioned opening 40 is included within forward wall 28 and aligned with opening 34. Further openings 42,44 are contained within top wall 36 and bottom wall 40 of overhang 30, respectively.

In order to permit closing off the openings, removable doors or panels 48,50 are included within top and bottom walls 36,46, respectively. These panels are fitted in their respective openings and are retained therein by any convenient means such as fasteners (not shown). Alternatively, these doors may be constructed to be slidable within their respective supporting structures as commonly found with sun roofs on vehicles.

With particular reference to FIG. 3, it may be seen that the openings are closable by means of oppositely movable sliding doors 52,54 mounted on the rear wall 24 and front wall 32, respectively. These doors are designed to slide within the space formed between the front and rear walls and are therefore very economic of space. Each door is mounted on roller supported on a pair of laterally directed tracks 56,58. Articulated arms 60,62 allow the doors to pivot into and out of their respective openings, thereby providing a flush surface when the openings are fully obturated.

In order to further facilitate transference of passengers between the cab and the camper, the center portion 64 of seat 66 is separated from the remaining portions of the seat to form right and left halves 68,70. The center portion is pivotable by means of pivots 72,74 located at the front corners thereof.

Turning to FIGS. 5-7, a boot seal is shown generally at 76 which seals out unwanted air, dirt, and other contaminants which might otherwise enter the cab or camper body through the space between the two. As may be seen, the boot is in the form of a generally rectangular, planar flexible member. As particularly shown in FIG. 7, the boot is made up of a top cover 78 and bottom cover 80 which may be of fabric such as nylon or vinyl. The covers are sewn into a quilted pattern to encompass therebetween cells 82 arrayed in rows and columns to form a quilted pattern. The cells contain an insulative material such as, for example, kapok or polyester fill/foam 84. When the boot is formed around the periphery or perimeter 86 and fastened thereto, it forms an effective seal. Fastening is accomplished by means of a plurality of fasteners 88, on forward wall 28 and on a rear wall 24 (not shown). Corresponding fasteners are attached to the longitudinal edges 90,92 of boot 86 for this purpose. Conveniently, these fasteners may be in the form of a strip of Velcro material which allows the easy attachment and removal of the boot.

It is to be understood that the foregoing description is merely illustrative of the preferred embodiment of the invention, and that the scope of the invention is not to be limited thereto, but is to be determined by the scope of the appended claims.

What is claimed is:

1. In combination, a truck including a cab defining a laterally directed rear wall and a longitudinally directed, generally horizontal bed for supporting a load extending rearwardly from said cab, an enclosed camper body defining a laterally directed forward wall facing said rear wall of said truck cab,
a first opening in said rear wall of said truck cab,
a corresponding second opening in said forward wall of said camper body, said cab and camper body openings being aligned, one with the other,
said camper body being positioned rearwardly of said truck cab so as to define a space between said truck cab rear wall and said camper body forward wall,
a first slidable door and means on said truck cab rear wall for sliding said first door laterally between a first position obturating said first opening in said rear wall of said truck cab to a second position uncovering said first opening and within said space, and,
a second slidable door and means on said forward wall of said camper body for sliding said second door laterally in a direction opposite to the direction of sliding of said first door, between a first position obturating said second opening to a second position uncovering said second opening so that passengers may move to and from said cab and said camper.

2. The combination of claim 1 wherein said first and second slidable door means comprise generally planar doors and wherein said means for sliding said first and second doors comprise track means.

3. The combination of claim 2 wherein said means for sliding said first and second doors further comprise articulated arm means on said doors so that they are first longitudinally movable into and out of their associated openings and thence in opposite lateral directions in said space.

4. The combination of claim 1 further including a seat in said truck cab extending across said first opening so that the center portion thereof obturates the lower portion of said first opening, said center portion of said seat being separable from the remainder of said seat and further including pivot means whereby said seat center portion may be pivoted forwardly into said cab out of obturating relationship with said first opening thereby facilitating movement between said cab and camper.

5. The combination of claim 1 wherein said truck cab defines a generally horizontal top wall, said camper body including a front overhang extending over said top wall and defining a generally horizontal bottom wall, said top wall including a third opening connecting with said first opening to form an extension thereof, and said bottom wall including a fourth opening so as to form an extension thereof.

6. The combination of claim 5 further including removable door means fitted within said third opening serving to close off said cab roof.

7. The combination of claim 1 wherein said door means are in their second position uncovering their associated openings, and further including boot means around the perimeter defined by said openings.

8. The combination of claim 7 wherein said boot means comprise an elongated flexible planar member defining opposite longitudinal edges, and further including first fastener means on said flexible member along said edges releasably engageable with second fastener means on said forward wall and said rear wall.

9. The combination of claim 8 wherein said flexible member is quilted and defines a plurality of interior spaces including insulative material therein.

10. The combination of claim 1 wherein said first and second openings are located on the longitudinal central axis defined by said truck cab and camper body so as to be centered with respect to said cab rear wall and said camper body forward wall.

* * * * *